(12) United States Patent
Mühle et al.

(10) Patent No.: US 10,773,765 B2
(45) Date of Patent: Sep. 15, 2020

(54) BICYCLE FRAME, IN PARTICULAR FOR ELECTRIC BICYCLES, ELECTRIC BICYCLE AND MOBILE LIGHTING DEVICE AND ADAPTER PARTS FOR BICYCLE ACCESSORIES

(71) Applicant: eurorad Deutschland GmbH, Köln (DE)

(72) Inventors: Sören Mühle, Berlin (DE); Alexander De Ponte, Overath (DE)

(73) Assignee: eurorad Deutschland GmbH, Cologne (DE)

( * ) Notice: Subject to any disclaimer, the term of this patent is extended or adjusted under 35 U.S.C. 154(b) by 0 days.

(21) Appl. No.: 16/478,282

(22) PCT Filed: Jan. 15, 2018

(86) PCT No.: PCT/IB2018/050237
§ 371 (c)(1),
(2) Date: Jul. 16, 2019

(87) PCT Pub. No.: WO2018/130999
PCT Pub. Date: Jul. 19, 2018

(65) Prior Publication Data
US 2019/0382067 A1    Dec. 19, 2019

(30) Foreign Application Priority Data

Jan. 16, 2017  (DE) .................. 20 2017 100 204
Jun. 16, 2017  (DE) .................. 20 2017 103 600
Jul. 14, 2017  (DE) .................. 20 2017 104 231

(51) Int. Cl.
*B62J 45/00*    (2020.01)
*B62J 15/02*    (2006.01)
(Continued)

(52) U.S. Cl.
CPC ............... *B62J 15/02* (2013.01); *B62J 6/015* (2020.02); *B62J 6/02* (2013.01); *B62J 6/04* (2013.01);
(Continued)

(58) Field of Classification Search
CPC ... B60J 15/02; B60J 6/015; B60J 6/029; B60J 6/04; B60J 6/00
See application file for complete search history.

(56) References Cited

U.S. PATENT DOCUMENTS

2014/0308062 A1* 10/2014 Belozerova .......... F16M 11/041
                                                        403/14
2014/0355200 A1* 12/2014 Thiers .................. F16M 11/105
                                                        361/679.41

FOREIGN PATENT DOCUMENTS

CN    103683433 A    3/2014
CN    103957739 A    7/2014
(Continued)

OTHER PUBLICATIONS

International Search Report Application No. PCT/IB2018/050237 Completed: Apr. 18, 2018; dated Apr. 30, 2018 4 pages.
(Continued)

*Primary Examiner* — John D Walters
*Assistant Examiner* — James J Triggs
(74) *Attorney, Agent, or Firm* — Whitmyer IP Group LLC

(57) ABSTRACT

A bicycle frame including frame struts, an electric motor, one compartment for a power supply unit and multiple supply cables for a front light and a rear light which are fastened by a multiple-part adapter arrangement with a bicycle-side adapter part and a lighting device-side adapter part. The invention offers a new lighting concept for bikes with detachable front and rear lights by use of two adapter parts being each provided with one closure part of a mul-
(Continued)

tiple-part closure device, which closure parts are attachable and mechanically latchable together by means of a closing motion, wherein the closure parts each include at least one magnet element or magnet counter-element interacting in a magnetically attractive manner, when the first closure part is placed onto the second closure part, and wherein each adapter part includes non-contact or contacting coupling elements for energy transmission, which are electrically coupled in the closed position.

20 Claims, 6 Drawing Sheets

(51) Int. Cl.
  B62J 6/02      (2020.01)
  B62J 6/04      (2020.01)
  B62M 6/55      (2010.01)
  B62M 6/90      (2010.01)
  B62J 6/015     (2020.01)
(52) U.S. Cl.
  CPC ............. B62M 6/55 (2013.01); B62M 6/90 (2013.01); B62J 45/00 (2020.02)

(56) References Cited

FOREIGN PATENT DOCUMENTS

| | | |
|---|---|---|
| CN | 104853636 A | 8/2015 |
| CN | 104939472 A | 9/2015 |
| CN | 204713345 U | 10/2015 |
| CN | 105711696 A | 6/2016 |
| CN | 205499144 U | 8/2016 |
| DE | 202009008968 U1 | 10/2009 |
| DE | 202013009772 U1 | 3/2015 |
| EP | 1520773 A1 | 4/2005 |
| EP | 2193066 A1 | 6/2010 |
| JP | 2009220667 A | 10/2009 |
| JP | 2013180592 A | 9/2013 |
| WO | 2014145748 A1 | 9/2014 |
| WO | 2015157967 A1 | 10/2015 |

OTHER PUBLICATIONS

Written Opinion of the International Searching Authority Application No. PCT/IB2018/050237 Completed: Date: Jul. 19, 2018 7 pages.
Chinese Office Action Application No. 2018800071959, dated Jul. 6, 2020, 2 pages.

* cited by examiner

BICYCLE FRAME, IN PARTICULAR FOR ELECTRIC BICYCLES, ELECTRIC BICYCLE AND MOBILE LIGHTING DEVICE AND ADAPTER PARTS FOR BICYCLE ACCESSORIES

TECHNICAL FIELD

The invention relates to a bicycle frame for electric bicycles, comprising multiple frame struts which form at least a down tube, a seat tube, and a head tube of the bicycle frame, comprising an electric motor and comprising at least one compartment for the preferably detachable arrangement of a power supply unit for the electric motor on one of the frame struts, comprising multiple supply cables for a front light and a rear light of an electrical lighting device on the bicycle, and comprising a multiple-part adapter arrangement for fastening the lighting device on the bicycle frame or on attachments on the bicycle frame, wherein mounted on the bicycle frame or on an attachment on the bicycle frame is a first, bicycle-side adapter part of the adapter arrangement, which can be connected to a lighting device-side adapter part for fastening the lighting device. The invention also relates to electric bicycles comprising a bicycle frame including multiple frame struts which form at least a down tube, a seat tube, and a head tube of the bicycle frame, comprising an electric motor, comprising at least one compartment for the preferably detachable arrangement of a power supply unit for the electric motor on one of the frame struts, comprising multiple supply cables for a front light and a rear light of an electrical lighting device on the bicycle, comprising attachments which include at least a set of handlebars and a stem for fastening the handlebars, and comprising a multiple-part adapter arrangement for fastening a lighting device on the bicycle frame or on one of the attachments on the bicycle frame, wherein mounted on the bicycle frame or on one of the attachments is a first, bicycle-side adapter part of the adapter arrangement, which can be connected to a lighting device-side adapter part for fastening the lighting device. The invention also relates, in particular, to mobile lighting devices for bicycles, in particular for electric bicycles, comprising a multiple-part adapter arrangement for fastening the lighting device on the bicycle, which comprises a first adapter part, which can be mounted on the bicycle, and a lighting device-side, second adapter part, wherein the two adapter parts are each provided with one closure part of a multiple-part closure device, wherein the closure part on the lighting device-side adapter part can be placed on the first, bicycle-side adapter part in order to close the closure device and can be mechanically latched together with this bicycle-side adapter part by means of a closing motion. Finally, the invention also relates to adapter parts for adapter arrangements for fastening accessories on bicycles.

BACKGROUND

The bicycle frames of numerous bicycles, in particular of city bicycles, touring bicycles, and bicycles for children, are provided, in the factory, with cabling for a lighting device, and a front light and a rear light are mounted on the bicycle frame by means of suitable holding mechanisms (adapter arrangements) in a manner which is fixed, although exchangeable. The generator for the electrical supply of the lighting device is either likewise mounted on the bicycle frame or is a component of the front wheel. The same applies for electric bicycles, wherein, in that case, the power supply of the lighting device is effectuated via a motor-side DC-DC converter. In modern bicycles comprising a factory-installed lighting device, the cabling is generally at least partially routed through the tube interior of the frame struts.

In the case of bicycle frames for sports bicycles, in particular in the case of bicycle frames for mountain bikes for off-road use, a fixedly installed lighting device is usually dispensed with. Cabling for the lighting device is not provided in such bicycles. Mountain bikes can likewise be equipped with an electric motor and the market share of electrified mountain bikes is increasing, wherein numerous customers do not exclusively utilize such an electrified mountain bike (E-MTB) off-road, but rather also for daily use, for the purpose of which accessories such as kickstands, fenders, luggage racks, and mobile, battery-operated lighting devices are retrofitted on the bicycle.

Electrified mountain bikes (or racing bicycles) also comprise a rechargeable battery, which is suitably sized according to the power requirement, as the power supply unit, and the motor of these mountain bikes is or can be provided with an internal DC-DC converter for the power supply of the lighting device. This would have the disadvantage, however, that the previously common lighting devices that are supplied by a generator or a converter in the electric motor remained on the bicycle frame even during an off-road use of the bicycle and, therefore, could become damaged or could get lost during jumps or falls. If factory-installed cabling for the lighting device is not present, the outlay required in order to retrofit a fixedly installed lighting device would also be disproportionate, which is why only plug-in lighting devices which are battery-operated, removable, and fastenable by means of adapter arrangements have been available so far.

The problem addressed by the invention is that of remedying this situation and of making it possible, in particular for the customer, to utilize the electric motor for the power supply of the lighting device, in the case of electric bicycles as well, if necessary.

This problem is solved, in the case of a bicycle frame or an electric bicycle, in that the front light and/or the rear light are detachable, the two adapter parts are each provided with one closure part of a multiple-part closure device, wherein the closure part on the lighting device-side adapter part can be attached by placing onto the first, bicycle-side adapter part in order to close the closure device and can be mechanically latched together with this bicycle-side adapter part by means of a closing motion, the first closure part and the second closure part each comprise at least one magnet element or magnet counter-element which interact with each other in a magnetically attractive manner, when the first closure part is placed onto the second closure part, in order to effectuate the closing motion for closing the closure device and latching the adapter parts, and the first adapter part and the second adapter part each comprise non-contact or contacting coupling elements for energy transmission, the coupling elements being coupleable to each other during the closing motion and being electrically coupled in the closed position, wherein the coupling elements on the bicycle-side adapter part are each connected to one of the supply cables.

SUMMARY

According to the invention, a bicycle-side adapter part is therefore provided on the bicycle frame or on the electric bicycle, which is suitable for the energy transmission for the power supply of the lighting device and is connected to the current generator, to which a lighting device-side adapter part can be coupled or is coupled, said adapter part being provided with non-contact or contacting coupling elements for the energy transmission, which are situated in a manner suitable with respect to the frame-side adapter part, wherein the two adapter parts utilize a magnet finding for the anchoring and use magnetic forces for closing the anchoring, and simultaneously offer a secure mechanical latching between the adapter parts. Closure devices having magnet finding already exist on the market, for example for the closure of bicycle helmets or articles of clothing, wherein mature systems having magnet finding give the customer the impression that the closure device closes "as if by magic", and wherein, thanks to a clever mechanical latching, a very solid mechanical locking is simultaneously achieved, but such closure devices are not usable or provided as adapters for bicycle lighting devices. The haptic and aesthetic advantage of such closure devices having magnet finding is also, in particular, that the closure device closes virtually by itself and the user does not need to do much more than to move the elements of the closure device toward each other. The invention utilizes these advantages for use and these aesthetic advantages, supplemented by an electrical coupling which can be effectuated in a non-contact manner, for example inductively, capacitively, or by means of far-field transmission, or which can be effectuated by means of contact elements which require a touching or contacting with contact counter-elements, and provides for the use thereof on adapter parts for the rapidly and easily effectuatable and detachable fastening of the lighting device on the bicycle frame of bicycles, or on accessories of bicycles.

Particularly high closing forces can be achieved when the two adapter parts are each provided with at least one magnet element; it would also suffice, however, when only one of the two adapter parts is provided with at least one magnet element which interacts with a magnetically attractable counter-element (magnet counter-element), such as, for example, a magnetically attractable element on another adapter part, for example a metal ball, disk, or plate. The magnet elements are, in particular, supermagnets having a high, volume-specific magnetic force (energy density), which preferably have energy densities of more than 50 $kJ/m^3$, in particular of more than 100 $kJ/m^3$.

According to one embodiment, the bicycle-side adapter part for the front light is fastened on the stem or is integrated into the stem. The use of the stem, in particular a custom design of a stem, is particularly advantageous, since the stem offers a universal point, wherein the front light is situated so as to be mechanically protected by way of the other frame parts and the position, and does not come into conflict with other parts, such as, for example, a resilient suspension fork. Depending on the frame geometry and arrangement, it would be required, at best, to route the shift cables, brake cables, and, if necessary, cables, for example, for the suspension fork in such a way that they do not interfere with the light field. For the integration of the holder, either a newly designed stem can be provided, or a cap is created, which can be utilized with a conventional stem, and into which the frame-side adapter part is integrated or on which the frame-side adapter part can be fastened.

The bicycle-side adapter part for the rear light can be fastened on the seat tube or can be integrated into the seat tube, or the bicycle-side adapter part for the rear light is fastened on a seat clamp or is integrated into the seat clamp, or the bicycle-side adapter part for the rear light is fastened on a seat support or is integrated into the seat support. The adapter part for the rear light should be attachable as high as possible, in order to ensure good visibility. Particularly advantageous, therefore, would be a position as high as possible on the seat tube, for the purpose of which the quick-release mechanism for the seat support according to one embodiment can also be utilized.

For the cabling, it is particularly advantageous when the seat tube is at least partially provided with a cable bushing for a supply cable for the rear light. According to one possible advantageous embodiment, the seat tube is provided, on the rear side, with an indentation, a thickened region, or a cap which is at least partially provided with a cable bushing for a supply cable for the rear light.

The invention also relates, in particular, to accessories for suitable bicycles and electric bicycles, in particular a mobile lighting device for bicycles. In order to solve the aforementioned problem, it is provided, according to the broadest idea of the invention, that the closure part of the first adapter part and the closure part of the second adapter part each comprise at least one magnet element or magnet counter-element which interact with each other in a magnetically attractive manner, when the first adapter part is placed onto the second adapter part, in order to effectuate the closing motion for closing the closure device of the adapter parts and for the latching thereof. According to the invention, the first adapter part and the second adapter part each comprise non-contact or contacting coupling elements for energy transmission, wherein the coupling elements can be coupled to each other during the closing motion and are electrically coupled in the closed position and provide for energy transmission or power transmission, and the coupling elements on the bicycle-side adapter part can each be connected or are each connected to a bicycle-side supply cable. This then makes it possible to utilize the lighting device with adapter arrangements having magnet finding on bicycles or bicycle frames that have already been provided with cabling at the factory. The supply cable is preferably connected to a converter on the motor, although the supply cable could also be connected to a generator, as is conventional, or to a central, separate rechargeable battery which is situated in a suitable position on or in the bicycle frame. The charging of this central rechargeable battery could take place, in particular, via one of the bicycle-side adapter parts provided with coupling elements and to which a charging plug is then connected, in order to charge the rechargeable battery, whereby the lighting device has been removed.

According to yet another, generalized aspect, the invention also relates to an electric bicycle comprising a bicycle frame including multiple frame struts which form at least a down tube, a seat tube, and a head tube of the bicycle frame, comprising an electric motor, comprising at least one compartment for the preferably detachable arrangement of a power supply unit for the electric motor on one of the frame struts, comprising supply cables for the power supply for a bicycle component or an accessory, comprising attachments which include at least handlebars and a stem for fastening the handlebars, and comprising a multiple-part adapter arrangement for fastening a bicycle component or an accessory on the bicycle frame or on one of the attachments on the bicycle frame, wherein mounted on the bicycle frame or on one of the attachments is a first, bicycle-side adapter part of the adapter arrangement, which is provided with a component-side or accessory-side adapter part for fastening the bicycle component or the accessory. In order to solve the aforementioned problem, in the case of such a bicycle frame, it is provided that the bicycle component or the accessory is detachable, the two adapter parts are each provided with one closure part of a multiple-part closure device, wherein the closure part on the component-side or accessory-side adapter part can be placed on the first, bicycle-side adapter part in order to close the closure device and can be mechanically latched together with the closure part on the bicycle-side adapter part by means of a closing motion, the first closure part and the second closure part each comprise at least one magnet element or magnet counter-element which interact with each other in a magnetically attractive manner, when the first closure part is placed onto the second closure part, in order to effectuate the closing motion for closing the closure device, and the first adapter part and the second adapter part each comprise non-contact or contacting coupling elements for energy transmission, the coupling elements being coupleable to each other during the closing motion and being electrically coupled in the closed position, wherein the coupling element on the bicycle-side adapter part is connected to one of the supply cables in each case. In this solution, the accessory can be a holder for a mobile phone, wherein the holder is provided with a charging device for the mobile phone. In this case, the holder can be designed as a case or a protective sleeve which permanently remains on the mobile phone. According to one alternative embodiment, the accessory could also be a camera, in particular a camera for monitoring and observing the traffic located behind the vehicle driver, wherein, for this purpose, the adapter parts are preferably provided with detachably coupleable signal transmission elements for the signal transmission of the camera signals to a display device. The bicycle component can also be, in particular, a front light, a rear light, and/or a brake light, or a fender including a front light, a rear light, and/or a brake light, or a display unit or a combined display-control unit for controlling the pedal-force assistance output by the electric motor.

The invention also relates to the particular adapter part for a multiple-part adapter arrangement for the detachable fastening of a bicycle component or an accessory on a bicycle frame or on an attachment on a bicycle frame, wherein the adapter arrangement comprises a first, bicycle-side adapter part and a second, component-side or accessory-side adapter part for fastening the bicycle component or the attachment on the bicycle frame, wherein, according to the invention,
  each adapter part is provided with one closure part of a multiple-part closure device, wherein the closure part on the component-side or accessory-side adapter part can be placed on the first, bicycle-side adapter part in order to close the closure device and can be mechanically latched together with the closure part on the bicycle-side adapter part by means of a closing motion,
  each closure part comprises at least one magnet element or magnet counter-element which interact with each other in a magnetically attractive manner, when the first closure part is placed onto the second closure part, in order to effectuate the closing motion for closing the closure device, and
  each adapter part comprises at least one non-contact or contacting coupling element for energy transmission, which can be coupled to each other during the closing motion and are electrically coupled in the closed position, wherein the coupling element on the bicycle-side adapter part is connected or can be connected in an energy-transmitting manner to a bicycle frame-side supply cable in each case.

In all the embodiments of the adapter arrangement comprising adapter parts including magnet elements or magnet counter-elements, it is advantageous, in particular, when the closing motion can be effectuated by means of a linear motion and/or a rotation. Alternatively or additionally, the closure device can comprise a spring-loaded retaining device. The retaining device provides for the releasable latching of the closure parts and, therefore, of the adapter parts as well, wherein the release takes place with the aid of a suitable unlocking motion which is preferably different from the closing motion. The retaining device can also be opened in another way, however, in order to separate the adapter parts.

According to yet another alternative embodiment, the rear light can also be an integral component of a fender, wherein the rear light is situated at one end of the fender and the lighting device-side adapter part is situated on the other end of the fender and can be coupled to the bicycle-side adapter part, whereby the fender is simultaneously fastened. The rear light can also be situated at any other point on the rear wheel fender, for example in the centre, wherein the lighting device-side adapter part is then situated at one end of the fender.

According to yet another embodiment, a central rechargeable battery for the lighting device can be situated on or, preferably, in the bicycle frame, preferably in the base region of the seat tube, the cabling for the lighting device being connected or connectable to said battery, wherein preferably at least one of the bicycle-side adapter parts can be connected to a charging plug interacting with coupling elements of said adapter parts. In an embodiment comprising contacting coupling elements, i.e., comprising contact elements, the bicycle-side contact elements and/or the lighting device-side contact elements are preferably preloaded, in particular being designed to be preloaded under spring tension, in order to ensure a secure contact between the particular contact elements in the closed position of the closure device.

The invention has considerable advantages for the user, since he/she can alternatively securely attach or detach the lighting device or the accessory requiring the electrical energy on the bicycle frame or the bicycle, depending on the intended use for his/her bicycle, and, when the lighting device is attached, the power supply of the front and the rear lights is ensured and, when the accessory is attached, the electrical power supply of the accessory is ensured. Bicycles comprising a suitable lighting device can therefore even meet the strict domestic requirements for approval for road use as transportation means, since mountain bikes or racing bicycles have been approved for use on roads only on a limited basis, due to the absence of a fixedly installed lighting device.

The invention combines an adapter arrangement comprising adapter parts, the closure device of which is magnetically guided and, therefore, offers an advantageous closing feel, is mechanically latched and, therefore, ensures a stable connection, and is simultaneously electrically coupled and, therefore, provides for an electrical supply, wherein all this can be carried out by means of one single manual step. Since previously utilized adapter arrangements for mobile battery-operated lights each utilize a relatively complicated mechanical latching, the invention, in the broadest application thereof, is even provided for battery-operated lighting devices and the fastening devices (adapter arrangements) thereof. In the case of adapter devices for battery-operated mobile lighting devices, the coupling elements, which can be coupled to each other, can be dispensed with or, in any case, they are not connected to supply cables.

For the purpose of installation in the factory, the adapter parts can comprise non-contact or contacting coupling elements which are fabricated for the different e-bike system-specific cables (manufacturers such as Brose, Bosch, Shimano, for example). The corresponding adapter parts can then be installed even during the production or assembly of the bicycle frames or bicycles. Yet another advantage is that it is up to the customer to acquire a suitable lighting device or not, which, in turn, allows for a more variable pricing of the bicycles.

BRIEF DESCRIPTION OF THE DRAWINGS

Further advantages and embodiments of a bicycle frame according to the invention and of a mobile lighting device or other electrically connected accessories for electric bicycles and the adapter parts utilized according to the invention for this purpose result from the following description of exemplary embodiments schematically shown in the following drawings.

DETAILED DESCRIPTION

Figure 1:
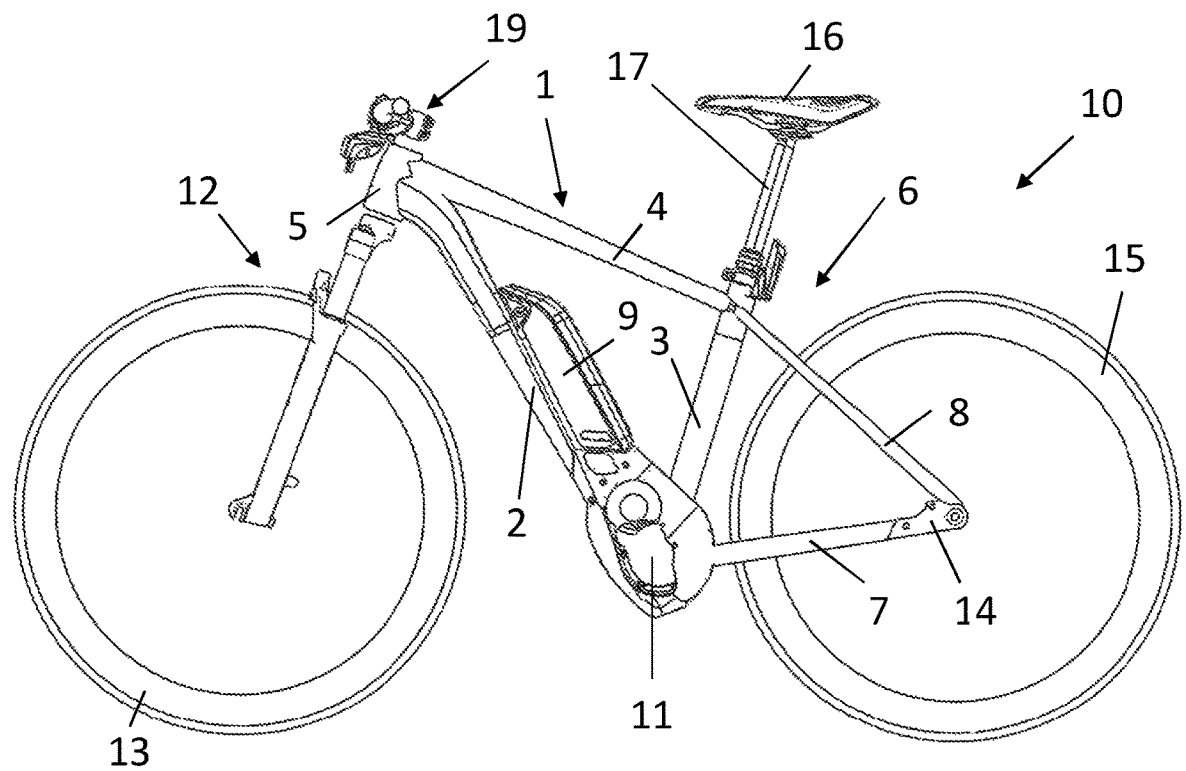
FIG. 1 shows a side view of an electric bicycle comprising a bicycle frame according to the invention and comprising a front and a rear light installed by means of the adapter parts according to the invention.
Figure 2:
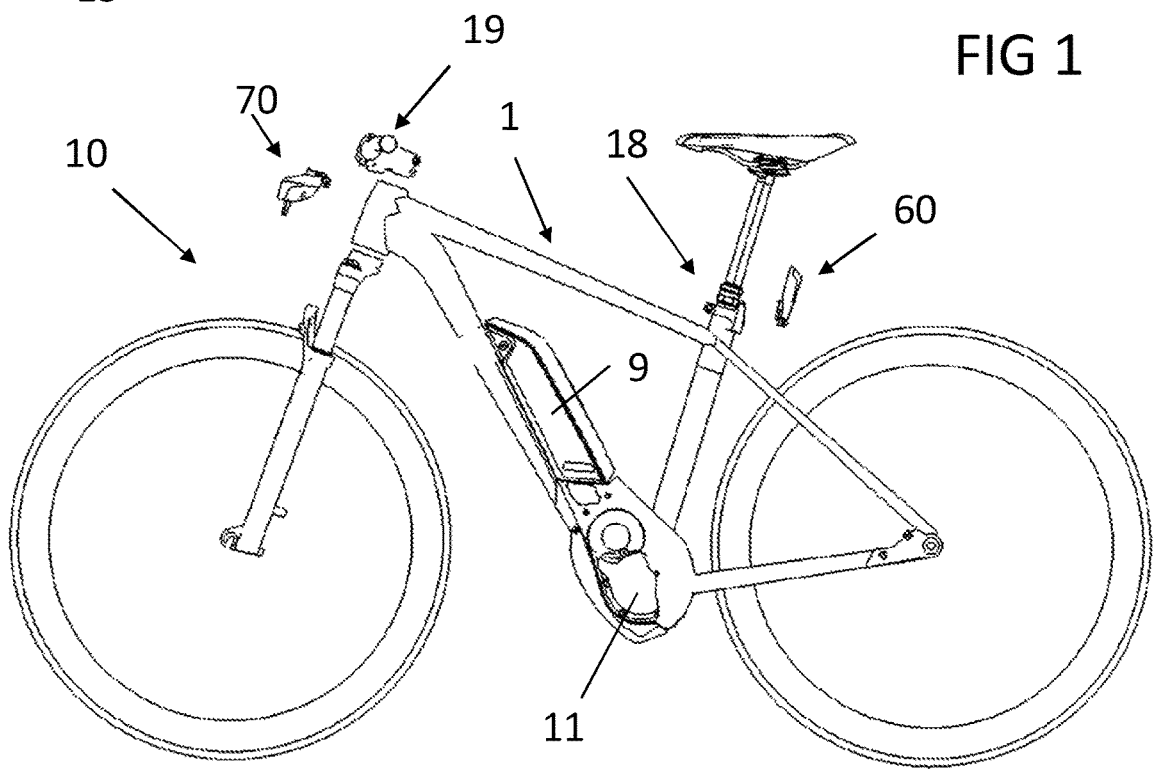
FIG. 2 shows the bicycle frame from FIG. 1 with the front and the rear lights detached.

In FIGS. 1 and 2, an electric bicycle according to the invention is labelled in entirety with reference sign 10 and comprises a bicycle frame 1 which, in the exemplary embodiment shown, includes a down tube 2, a seat tube 3, a top tube 4, a steering tube 5 connected to the down tube 2 and the top tube 4, as well as a rear structure 6 including chain stays 7 and seat stays 8. A power supply unit 9 is preferably detachably fastened on the bicycle frame 1 and, in this case, is fastened on the top side of the down tube 2 and is electrically connected via a plug socket or the like to an electric motor 11 which provides the user of the electric bicycle 10 with pedal-force assistance. A front fork 12 is rotatably mounted on the steering tube 5, in a manner known to a person skilled in the art, via the fork stem of the front fork 12, and a front wheel 13 is rotatably supported by way of the front fork 12. With the aid of fork ends 14, via which the chain stays 7 and the seat stays 8 are connected in each case, a rear wheel 15 is rotatably supported at the fork ends 14. A seat 16 can be inserted into the seat tube 3 at different heights by way of the seat support 17 thereof, and the height position can be adjusted by the user by means of a seat clamp 18. A stem 19 is fastened on the fork stem of the front fork 12 and supports a set of handlebars having any design, in a manner known per se. A bicycle frame 1 or an electric bicycle comprising the aforementioned components is known and can be provided with highly diverse frame geometries and, depending on the intended use for men or women, can also be designed without the top tube 4. The bicycle frame 1 is intended for illustrating the idea of the invention, merely by way of example.

In the exemplary embodiment shown, the bicycle frame 1 is designed for the detachable attachment of a front light 70 and/or the detachable attachment of a rear light 60, i.e., for the installation of a lighting device which is mobile, since it is removable. For this purpose, the front light 70 can be detachably fastened on the stem 19 and the rear light 60 can be detachably fastened on the seat clamp 18. The power supply or energy supply of the rear light 60 and of the front light 70 takes place via the power supply unit 9 or via a generator or current converter on the electric motor 11.

In order to enable power to be supplied even though the rear light 60 and the front light 70 are detachable, and to simultaneously ensure an extremely user friendly and secure locking of the rear light 60 and the front light 70, the connection to the bicycle frame takes place via a multiple-component adapter arrangement which comprises a first bicycle-side adapter part and a second adapter part which interacts and mechanically latches therewith, and which is situated on the housing of the front light 70 or the rear light 60.

Figure 3:
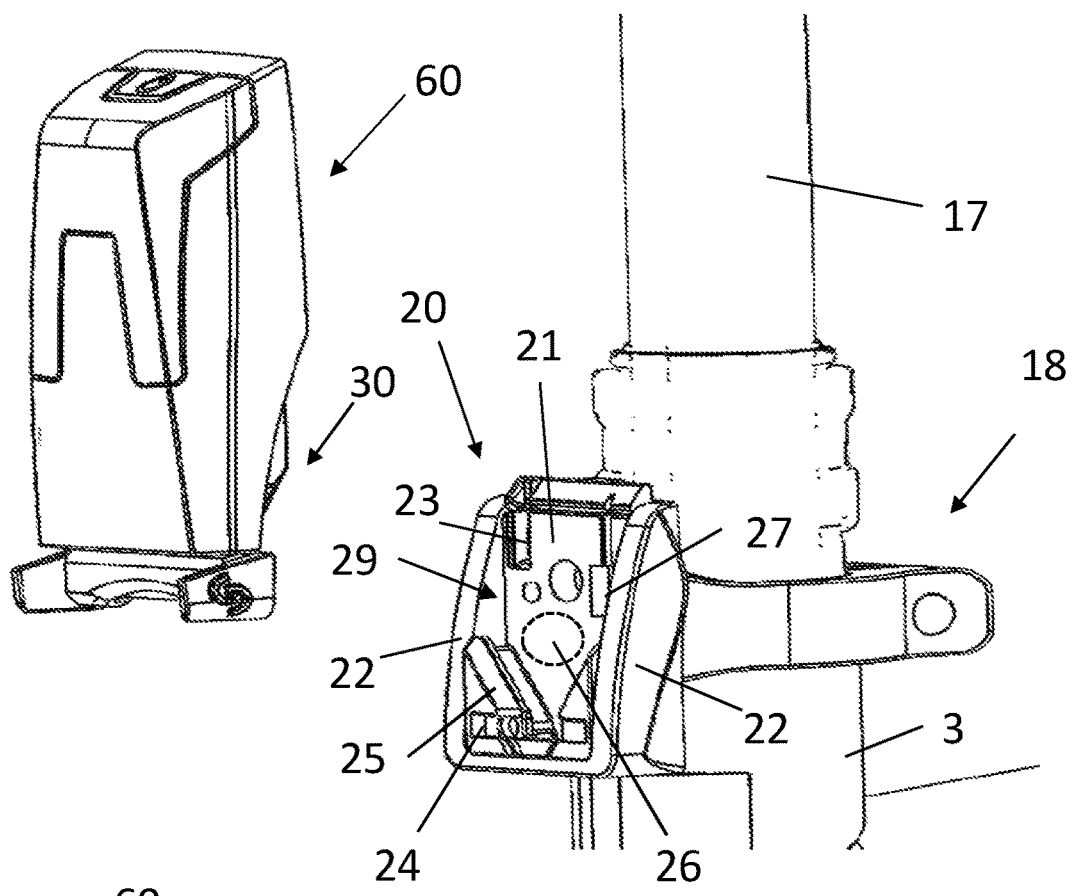
FIG. 3 shows a perspective view of a first adapter part installed on the bicycle, and a detached rear light.
Figure 4:
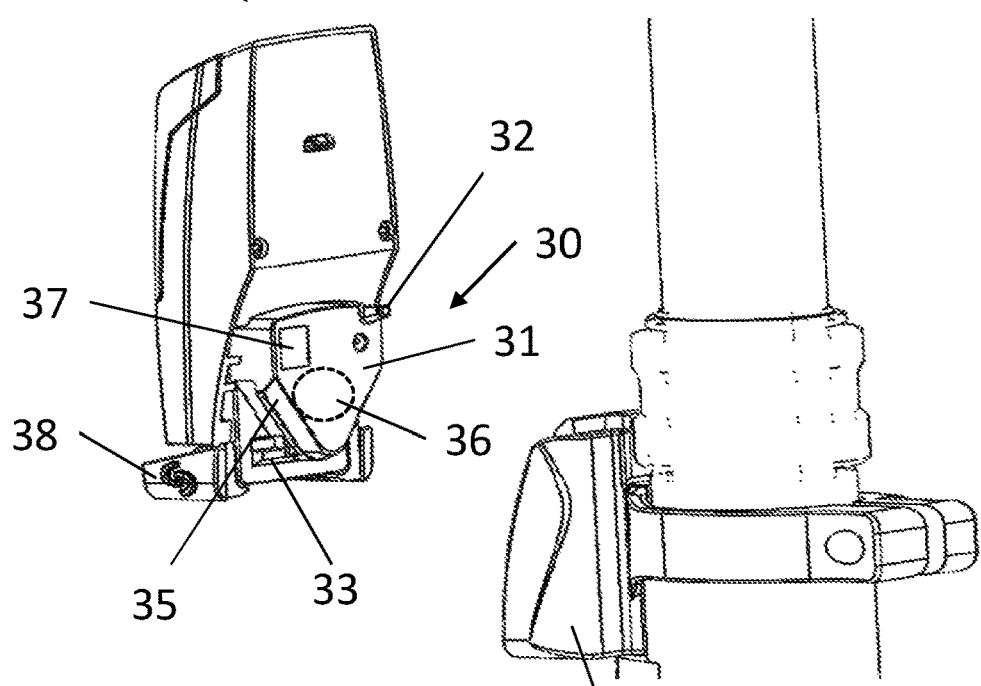
FIG. 4 shows a perspective view of the elements from FIG. 3 as seen in a view of the second adapter part on the rear light.

Reference is now made to FIGS. 3 and 4 which show the detachable fastening of the rear light 60 on the seat clamp 18 by means of such an adapter arrangement. The seat clamp 18 situated on the top end of the seat tube 3 is provided with a first adapter part 20 which is labelled in entirety with reference sign 20 and which can be connected to and mechanically latched with the lighting device-side, second adapter part 30 on the back side of the housing of the rear light 60. The bicycle frame-side, first adapter part 20 comprises a cavity which is not specifically represented and which is closed toward the front by means of a base plate 21 and toward the sides by means of side walls 22, wherein the side walls 22 protrude toward the front beyond the base plate 21, and therefore an engagement recess 26 on the adapter part 20 is formed. Situated at the bottom of the engagement recess, i.e., in the base plate 21, are a vertically extending groove 23, a groove 24 extending parallel thereto, and two angle pieces 25 which are situated with respect to each other in a "V" shape, as locking or closure parts for establishing a detent connection. Situated on the lighting device-side adapter part 30, on a retaining cam 31 which can be inserted into the engagement recess, are a guide pin 32, as a projection, and a movable blocking element 33, and the retaining cam 31 tapers at the lower end 34 thereof in the shape of a "V" and has protruding flanks 35. Situated in the adapter part 20 is at least one magnet element 26, preferably in the cavity under the base plate 21, and situated in adapter part 30 is a magnet element 36 as well, preferably in the interior of the retaining cam 31, wherein the polarity of the magnet elements 26, 36 is selected in such a way that the magnets 26, 36 magnetically attract and initiate the closing motion by means of the generated magnetic force when the adapter parts 20, 30 are moved close to each other. The magnetic interaction then ensures that the guide pin 32 engages into the groove 23, the angle pieces 25 engage under the retaining cam 35 and, simultaneously, at the end of the closing motion, the blocking element 33 engages into the groove 24 in a latching manner, whereby the particular closure parts of the adapter parts 20, 30 formed in pairs by the pin, the engagement recess, the blocking element, the grooves, and the retaining cams mechanically prevent the separation of the adapter parts and ensure the secure locking of the connection of the two adapter parts 20, 30.

In addition to this mechanical latching, which is assisted by magnets 26, 36 during the closing motion, an electrical coupling which enables an energy transmission also takes place by means of the adapter parts 20, 30. To this end, the adapter part 20 is provided with a contact element 27 which is only schematically represented and which generally comprises at least two contact pins or the like for the different electrical polarity, and the adapter part 30 is provided, on the cover side of the retaining cam 31, with a corresponding contact element 37 which is suitably positioned, wherein, at the end of the closing motion, the contact elements 27, 37 are positioned with respect to each other in such a way that energy transmission takes place. The lighting device-side contact element 37 is therefore connected to the light source in the rear light 60, and the bicycle frame-side contact element 27 is connected via a cabling (not represented) to the power supply unit, the electric motor, or a generator. In order to detach the two adapter parts 20, 30, the blocking element 33 forming the retaining device is connected to the adapter part 30 via a latch comprising a handle part 38, wherein the blocking element or the handle part are preferably preloaded in the detent direction by means of a spring and the spring force must be overcome in order to enable detaching.

Figure 5:
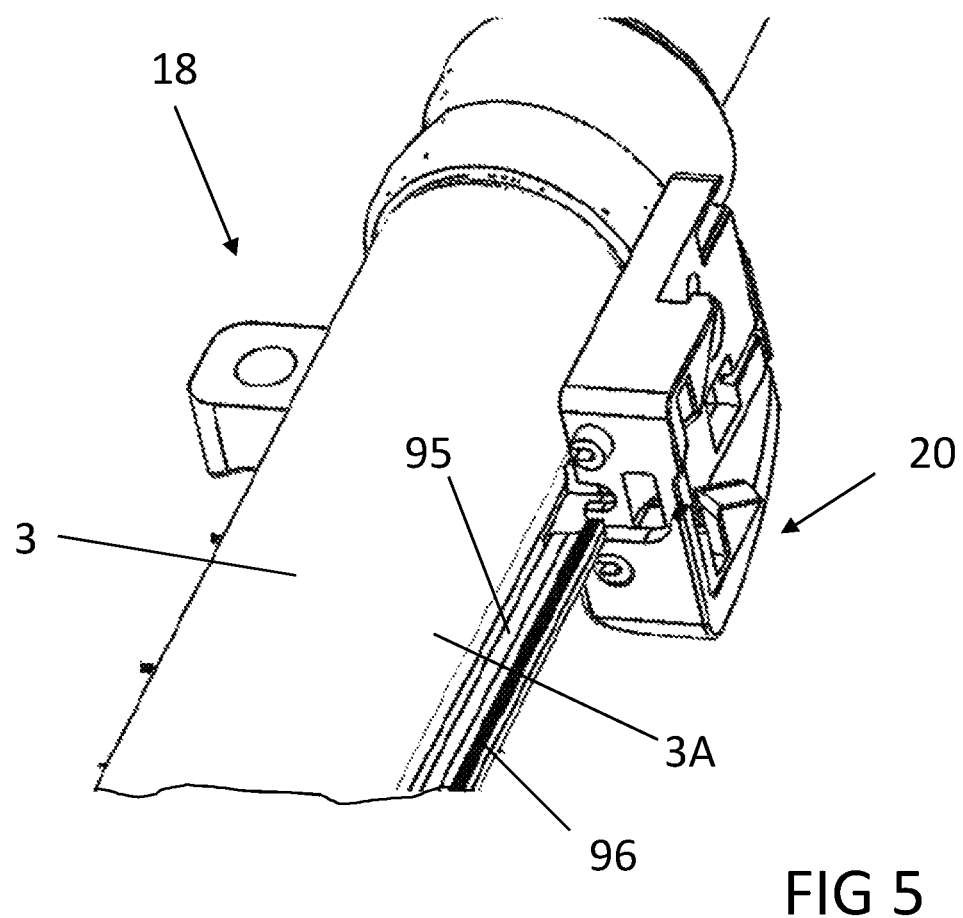
FIG. 5 shows the bicycle frame-side adapter part on the seat tube comprising a cable channel.

FIG. 5 shows the adapter part 20 together with the seat clamp 18 in the installed state on the seat tube 3. The seat tube comprises, in the rear region, a bulge 3A, in which a cable duct 95 is formed, via which an electrical cable 96 connected to the contact element in the adapter part 20 can be guided along the seat tube 3 to the power supply unit in the down tube. The cable duct 96 is shown open in FIG. 5, although it can also be closed, and the cable duct could also be located internally in the seat tube 3 when the seat tube comprises multiple chambers, one of which forms an insertion opening for the seat support and another chamber forms the cable-routing duct.

Figure 6:
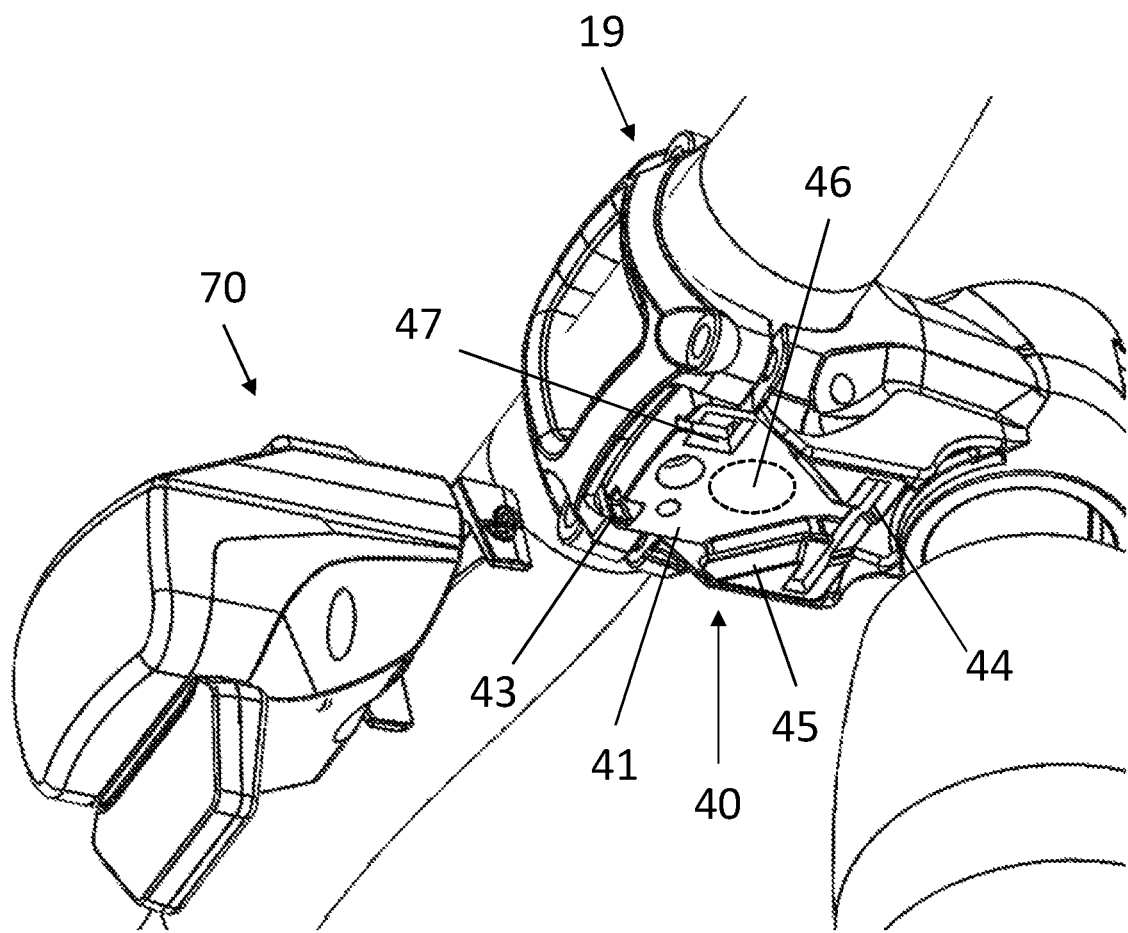
FIG. 6 shows a perspective view of a bicycle-side adapter part located on a stem, with the front light detached.
Figure 7:
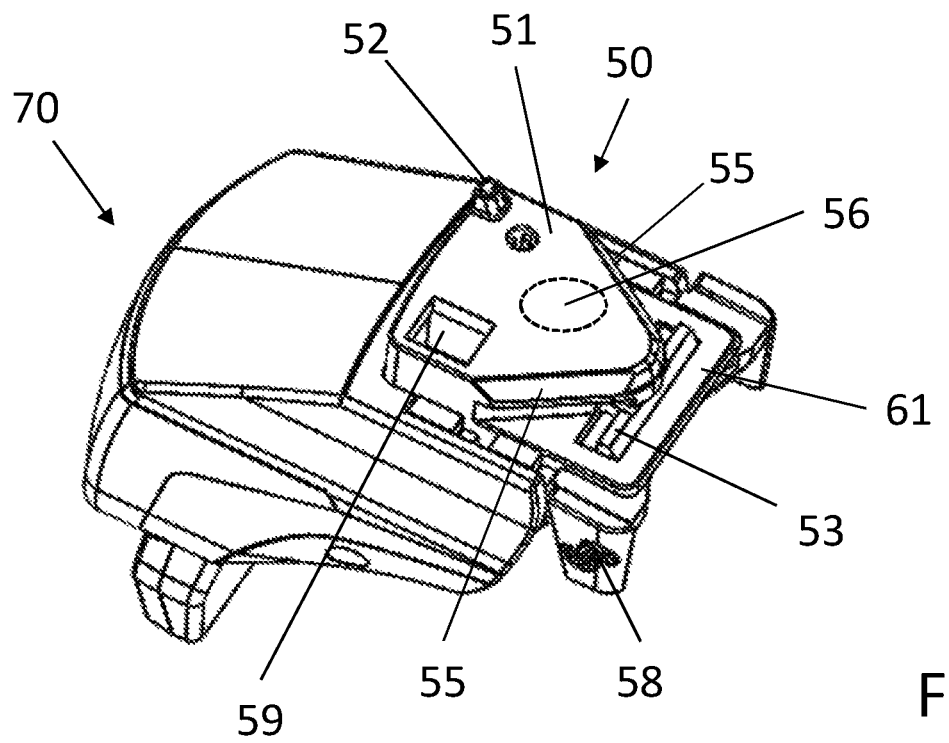
FIG. 7 shows a perspective view obliquely from above of the front light from FIG. 6.

FIGS. 6 and 7 show the fastening of the front light 70 on the stem 19 by means of a suitable adapter part 40 on the stem 19 and by means of an adapter part 50 on the front light 70. The bicycle-side adapter part 40 integrated into the stem 19 has the same design, in principle, as the adapter part 20 on the seat clamp, namely a base plate 41 comprising a recessed first groove 43, comprising angle pieces 45 which are protrudingly situated on the base plate 41 and extend toward each other in the shape of a "V" and form an undercut facing the base plate 41, and comprising a second groove 44 extending transversely to the groove 43. At least one magnet 46 is situated in the cavity of the adapter part 40 and, in addition, a contact element 47 is situated in the base plate 41, which is electrically connected via a cabling (not represented) to the power supply unit, the electric motor, or a generator. The adapter part 40, which consists essentially of plastic, is accommodated, in one portion, so as to be integrated into the underside of the stem 19. The lighting device-side, second adapter part 50 is located on the top side of the housing of the front light 70 and, as is exactly the case with the adapter part 30 for the rear light, in principle, is provided with an upwardly protruding retaining cam 51 which tapers toward the front in the shape of a "V" and comprises flanks 55 which protrude forward. The cover side of the retaining cam 51 is provided with an upwardly protruding guide pin 52 and a receiving opening 59 for a contact element (57, FIG. 8) is formed in the retaining cam 51. The retaining part 50 further comprises a magnet 56 recessed into the retaining cam 51 and a blocking element 53 formed by a detent strip, which extends transversely to the tapering edges 55. The blocking element 53, in turn, is connected to a handle part 58, wherein the blocking element 53 is preferably preloaded into a position, for example by means of a spring, in which the front edge of the blocking element 53 protrudes beyond a lower base surface 61 on the adapter part.

The adapter parts 40, 50 are also coupled to each other by means of a linear sliding motion, wherein the two magnets 46, 56, as soon as they are moved toward each other, cause the retaining cam 51 to be drawn toward the base plate 41, thereby engaging the guide pin 52 and the groove 43, as the first pair of closure elements, the edges 55 and the angle pieces 45, as the second pair of closure elements, and the blocking element 53 and the groove 44, as the third pair of closure elements, and cause the retaining cam 51 to be moved into the closed position, in which the blocking element 53 latches into the groove 44 and the angle pieces 45 engage under the edges 55. The linear motion can be optionally assisted and directed by means of a further pair of magnets and/or suitable guide surfaces.

Figure 8:
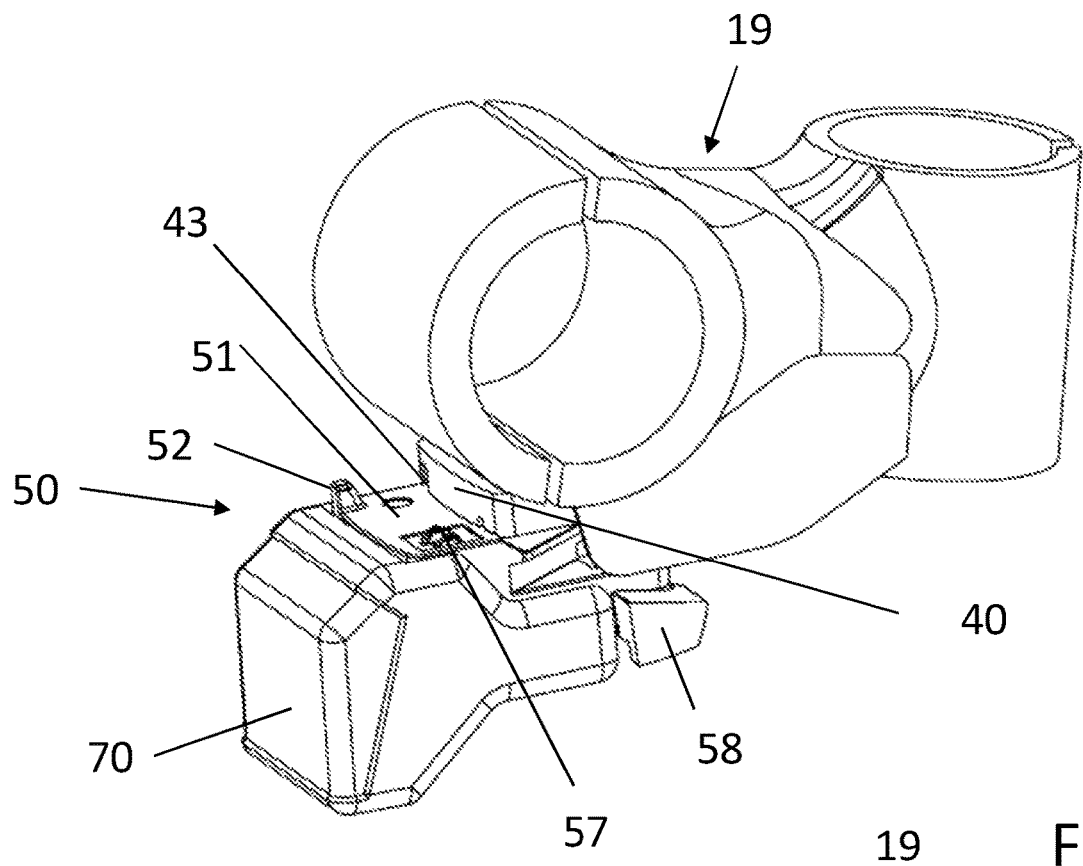
FIG. 8 shows a perspective schematic representation of the installation process of a front light on a stem comprising an adapter part according to the invention, before the engagement of the mechanical connection.
Figure 9:
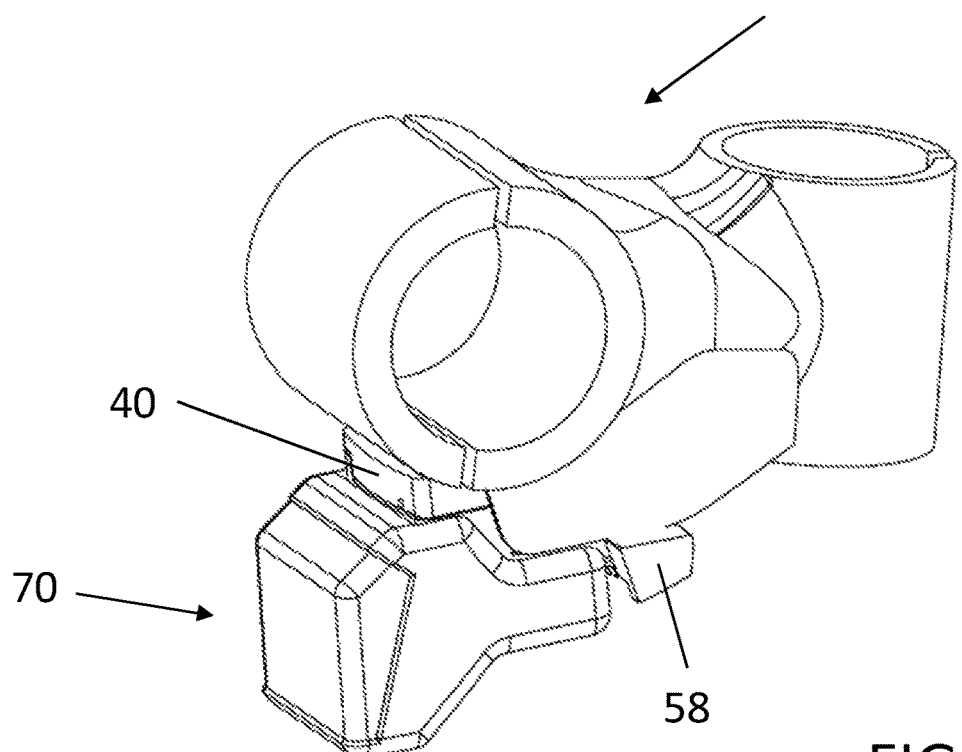
FIG. 9 shows a perspective schematic representation of the installation state of a front light on a stem comprising adapter parts according to the invention, after the engagement of the mechanical connection.

FIGS. 8 and 9 show, with reference to a schematically simplified diagram, the movement of the adapter part 50 on the front light 70 relative to the adapter part 40 on the stem 19. In FIG. 8, the retaining cam 51 rests, via the cover surface thereof, on the base plate of the bicycle-side adapter part 40, but the closure elements do not yet engage into each other. The handle part 58 is displaced downward, counter to the restoring force of a spring, because the blocking element (53, FIG. 7) connected thereto is displaced into an open position due to the retaining cam 51 resting against the base plate 41. The magnets in the two adapter parts 40, 50 then effectuate the final linear displacement, until all available closure elements, including the guide pin 52 and the groove 42, as well as the blocking element 53 and the groove 44, mechanically engage or latch into each other. This end position of the two adapter parts 50, 40 is shown in FIG. 9, wherein the handle part 58 is finally offset upward in this position, because the blocking element can engage into the associated groove.

Figure 10:
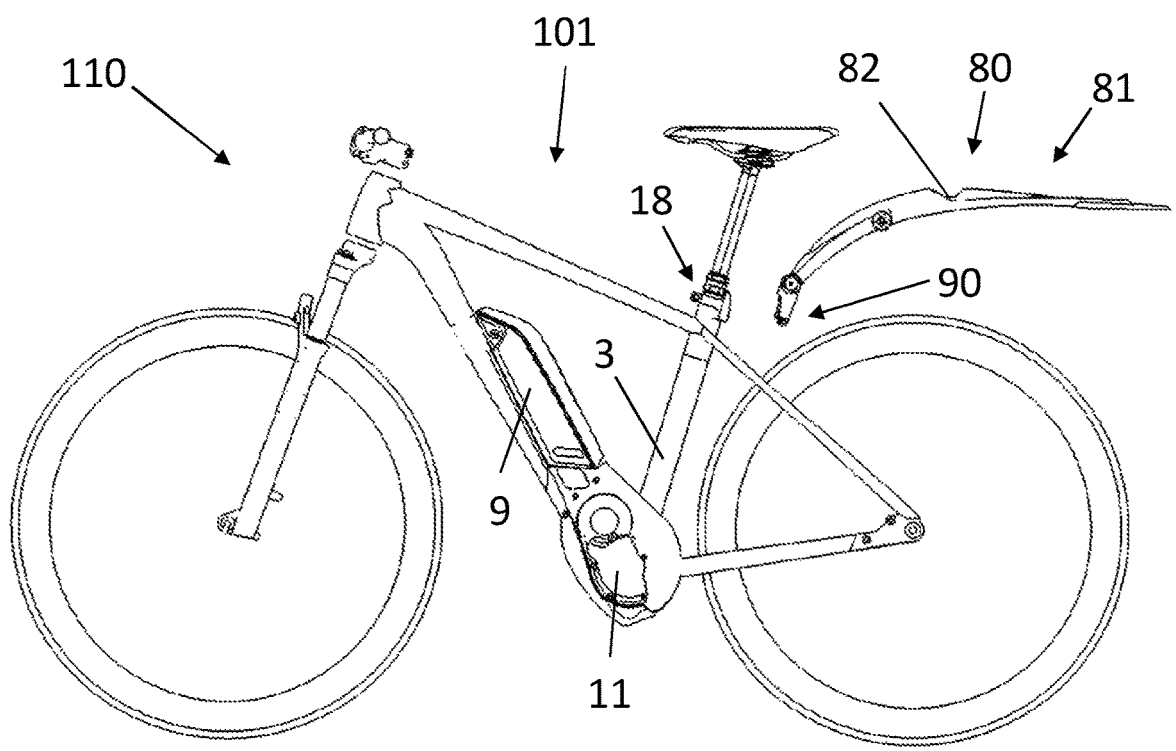
FIG. 10 shows an electric bicycle comprising a bicycle frame according to the invention and a rear wheel fender which can be installed by means of the adapter parts according to the invention.
Figure 11:
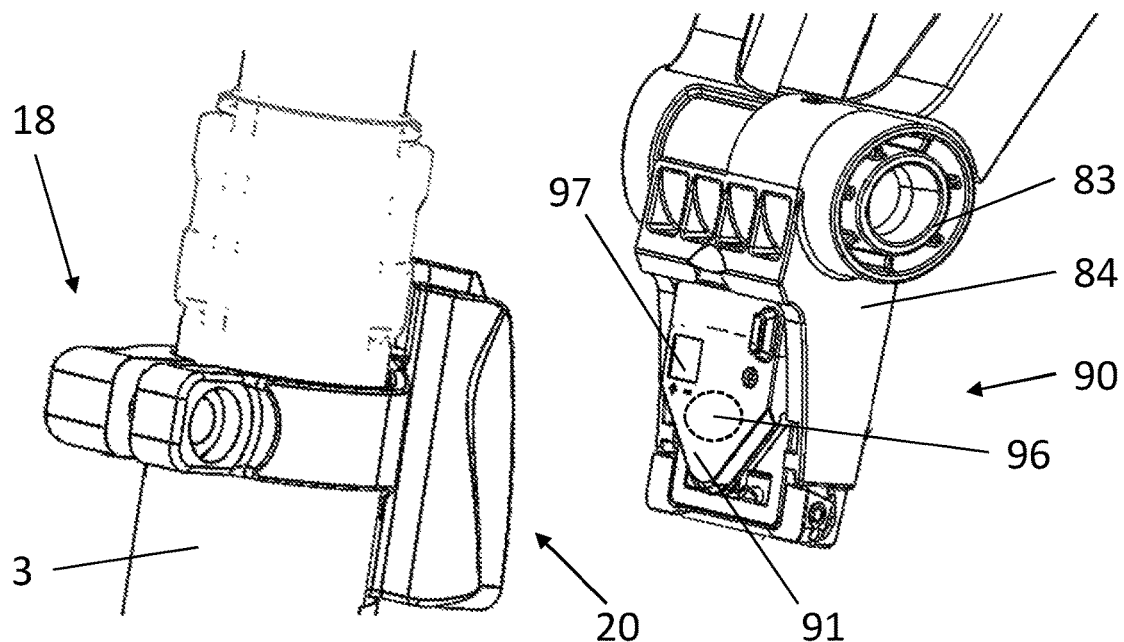
FIG. 11 shows the adapter part on the fender before the fastening on the bicycle-side adapter part fastened on the seat tube.

FIG. 10 shows an electric bicycle 110, the bicycle frame 101 of which has the same design as the bicycle frame in FIG. 1. The same reference signs as those used in the preceding exemplary embodiment are therefore used for all identical parts. The same seat clamp 18 as in the exemplary embodiment according to FIGS. 1 to 4 is fastened on the seat tube 3 and, in fact, by way of the identical adapter part 20, and therefore reference is made to the description of FIG. 3. In deviation from the preceding exemplary embodiment, however, a rear wheel fender 80 is fastened on the adapter part 20 of the seat clamp 18, said fender likewise being provided with an adapter plate 90 for this purpose, wherein the adapter plate 90 has the same design, in principle, as the adapter plates 30 and 50. The fender 80 is provided with a recess 81 approximately in the centre, in which a light bar 82 is situated in such a way that, in the installed state of the fender 80 on the bicycle frame 101, the light bar forms the rear light. In this case as well, the power supply of the light bar in the fender 80 takes place via the power supply unit 9 or the electric motor 11, because the adapter part 90, which is situated on the front end of the fender 80 in a base part 84 of the fender 80 provided with a pivot joint 83, comprises a retaining cam 91, in which not only a magnet 96 but also a contact element 97 for the electrical power supply and coupling is recessed. The contact element 97 in the adapter part 90 interacts with the associated contact element on the adapter part 20 when the closed position of the two adapter parts 20, 90 is reached and provides for an electrical power transmission in this closed position. The design of the retaining cam 91 and of the individual closure elements, which mechanically latch together, on the two adapter parts 20, 90 is the same as in the preceding exemplary embodiments, and therefore an explanation will not be provided again.

A person skilled in the art will identify numerous further modifications and areas of application which are to fall within the scope of protection of the attached claims. The exemplary embodiments describe adapter parts comprising mechanical locking mechanisms which include angle pieces situated in the shape of a "V" and a retaining cam tapering in the shape of a "V". This forms only one possible embodiment, without the invention being limited thereto. All the embodiments describe contact elements which can transmit energy due to direct contacting. Non-contact coupling elements can also be provided on the adapter parts, which transmit energy, for example, inductively or electromagnetically. In addition to lighting devices, other accessories such as charging shells for mobile phones, cameras, a brake light, control lights for the electric motors, etc., can also be connected to the bicycle frame by means of the adapter parts. To this end, the stem could be provided with an adapter part both on the top side and on the bottom side, in order to detachably fasten not only the light but also the control unit on the stem and to supply these with energy.

The invention claimed is:

1. A bicycle frame for electric bicycles, comprising multiple frame struts which form at least a down tube, a seat tube, and a head tube of the bicycle frame, including an electric motor and including at least one compartment for the arrangement of a power supply unit for the electric motor on one of the frame struts, including multiple supply cables for a front light and a rear light of an electrical lighting device on the bicycle, and including a multiple-part adapter arrangement for fastening the lighting device on the bicycle frame or on attachments on the bicycle frame, wherein mounted on the bicycle frame or on an attachment on the bicycle frame is a first, bicycle-side adapter part of the adapter arrangement, which is connectable to a lighting device-side adapter part for fastening the lighting device, wherein at least one of the front light and the rear light are detachable;

the two adapter parts are each provided with one closure part of a multiple-part closure device, wherein the closure part on the lighting device-side adapter part is attachable to the closure part of the first, bicycle-side adapter part in order to close the closure device and is mechanically latchable together with this bicycle-side adapter part by means of a closing motion;

the first closure part and the second closure part each include at least one magnet element or magnet counter-element which interact with each other in a magnetically attractive manner, when the first closure part is placed onto the second closure part, in order to effectuate the closing motion for closing the closure device; and the first adapter part and the second adapter part each include non-contact or contacting coupling elements for energy transmission, the coupling elements being coupleable to each other during the closing motion and being electrically coupled in the closed position, wherein the coupling element on the bicycle-side adapter part is connected to one of the supply cables in each case.

2. The bicycle frame according to claim 1, wherein the seat tube is at least partially provided with a cable bushing for a supply cable for the rear light.

3. The bicycle frame according to claim 2, wherein the seat tube is provided, on the rear side, with an indentation, a thickened region, or a cap which is at least partially provided with a cable bushing for a supply cable for the rear light.

4. The bicycle frame according to claim 1, wherein the closing motion is effectuable by means of a linear motion and/or a rotation.

5. The bicycle frame according to claim 1, wherein the closure device includes a spring-loaded retaining device.

6. An electric bicycle comprising a bicycle frame including multiple frame struts which form at least a down tube, a seat tube, and a head tube of the bicycle frame, including an electric motor, including at least one compartment for the arrangement of a power supply unit for the electric motor on one of the frame struts, including multiple supply cables for a front light and a rear light of an electrical lighting device on the bicycle, including attachments which include at least a set of handlebars and a stem for fastening the handlebars, and including a multiple-part adapter arrangement for fastening a lighting device on the bicycle frame or on one of the attachments on the bicycle frame, wherein mounted on the bicycle frame or on one of the attachments is a first, bicycle-side adapter part of the adapter arrangement, which can be connected to a lighting device-side adapter part for fastening the lighting device, wherein at least one of the front light and the rear light are detachable;

the two adapter parts are each provided with one closure part of a multiple-part closure device, wherein the closure part on the lighting device-side adapter part is attachable on the first, bicycle-side adapter part in order to close the closure device and is mechanically latchable together with the closure part on the bicycle-side adapter part by means of a closing motion;

the first closure part and the second closure part each include at least one magnet element or magnet counter-element which interact with each other in a magnetically attractive manner, when the first closure part is placed onto the second closure part, in order to effectuate the closing motion for closing the closure device; and the first adapter part and the second adapter part each include non-contact or contacting coupling elements for energy transmission, the coupling elements being coupleable to each other during the closing motion and being electrically coupled in the closed position, wherein the coupling element on the bicycle-side adapter part is connected to one of the supply cables in each case.

7. The electric bicycle according to claim 6, wherein the bicycle-side adapter part for the front light is fastened on the stem or is integrated into the stem.

8. The electric bicycle according to claim 6, wherein the bicycle-side adapter part for the front light is fastened on the seat tube or is integrated into the seat tube.

9. The electric bicycle according to claim 6, wherein the bicycle-side adapter part for the rear light is fastened on a seat clamp or is integrated into the seat clamp.

10. The electric bicycle according to claim 6, wherein the bicycle-side adapter part for the rear light is fastened on a seat support or is integrated into the seat support.

11. The electric bicycle according to claim 6, wherein the seat tube is at least partially provided with a cable bushing for a supply cable for the rear light.

12. The electric bicycle according to claim 11, wherein the seat tube is provided, on the rear side, with an indentation, a thickened region, or a cap which is at least partially provided with a cable bushing for a supply cable for the rear light.

13. The electric bicycle according to claim 6, wherein the closing motion is effectuable by means of a linear motion and/or a rotation.

14. The electric bicycle according to claim 6, wherein the closure device includes a spring-loaded retaining device.

15. The electric bicycle according to claim 6, wherein the rear light is an integral component of a fender, wherein the rear light is situated on the fender or on the rear end of the fender and the lighting device-side adapter part is situated on the front end of the fender and can be coupled to the bicycle-side adapter part, whereby the fender is simultaneously fastened.

16. The electric bicycle according to claim 6, wherein a central rechargeable battery for the lighting device, the bicycle component, or the accessory is situated on or in the bicycle frame, the cabling for the power supply of the lighting device, the bicycle component.

17. A mobile lighting device for bicycles, in particular for electric bicycles, comprising a multiple-part adapter arrangement for fastening the lighting device on the bicycle, which includes a first adapter part which can be mounted on the bicycle and a lighting device-side, second adapter part, wherein the two adapter parts are each provided with one closure part of a multiple-part closure device, wherein the closure part on the lighting device-side adapter part is attachable to the first, bicycle-side adapter part in order to close the closure device and can be mechanically latched together with the closure part of the bicycle-side adapter part by means of a closing motion, wherein the first closure part and the second closure part each include at least one magnet element or magnet counter-element which interact with each other in a magnetically attractive manner, when the first closure part is placed onto the second closure part, in order to effectuate the closing motion for closing the closure device, wherein the first adapter part and the second adapter part each include non-contact or contacting coupling elements for energy transmission, the coupling elements being coupleable to each other during the closing motion and being electrically coupled in the closed position, and the coupling elements on the bicycle-side adapter part can be connected or are connected to a bicycle-side supply cable in each case.

18. The mobile lighting device according to claim 17, wherein the closing motion is effectuable by means of at least one of a linear motion and a rotation.

19. The mobile lighting device according to claim 17, wherein the closure device includes a spring-loaded retaining device.

20. The mobile lighting device according to claim 17, wherein the rear light is an integral component of a fender, wherein the rear light is situated on the fender or on the rear end of the fender and the lighting device-side adapter part is situated on the front end of the fender and can be coupled to the bicycle-side adapter part, whereby the fender is simultaneously fastened.

\* \* \* \* \*